United States Patent
Kitano et al.

(10) Patent No.: US 8,035,367 B2
(45) Date of Patent: Oct. 11, 2011

(54) ELECTRONIC DEVICE, DETECTION CIRCUIT AND VOLTAGE CONTROL METHOD

(75) Inventors: Mayo Kitano, Kasugai (JP); Masatoshi Kokubun, Kasugai (JP); Takashi Matsumoto, Kasugai (JP)

(73) Assignee: Fujitsu Semiconductor Limited, Yokohama (JP)

( * ) Notice: Subject to any disclaimer, the term of this patent is extended or adjusted under 35 U.S.C. 154(b) by 411 days.

(21) Appl. No.: 12/412,704

(22) Filed: Mar. 27, 2009

(65) Prior Publication Data

US 2009/0243576 A1    Oct. 1, 2009

(30) Foreign Application Priority Data

Mar. 31, 2008  (JP) ................................ 2008-091405
Feb. 6, 2009   (JP) ................................ 2009-026519

(51) Int. Cl.
*G05F 1/563* (2006.01)
*H02M 3/335* (2006.01)

(52) U.S. Cl. .......... 323/285; 323/266; 323/284; 363/16; 363/146

(58) Field of Classification Search .................. 323/266, 323/282, 284, 285; 363/16, 17, 89, 97, 98, 363/146; 320/140, 141, 145, 162, 163
See application file for complete search history.

(56) References Cited

U.S. PATENT DOCUMENTS

| | | | |
|---|---|---|---|
| 7,550,951 B2 * | 6/2009 | Lai et al. ........................ | 320/163 |
| 7,888,919 B2 * | 2/2011 | Dishman et al. .............. | 323/266 |
| 7,903,439 B2 * | 3/2011 | Oettinger et al. ............... | 363/89 |

FOREIGN PATENT DOCUMENTS

JP   2002-078228 A   3/2002
JP   3428955 B2      5/2003

* cited by examiner

*Primary Examiner* — Gary L Laxton
(74) *Attorney, Agent, or Firm* — Arent Fox LLP

(57) ABSTRACT

A voltage control method includes producing an error signal based on a difference between a reference signal and an adaptor voltage and an adaptor current corresponding to the adaptor voltage, regulating, based on the error signal, the adaptor voltage, comparing a reference voltage to a voltage proportional to a potential corresponding to an identifying voltage corresponding to the adaptor voltage, detecting, based on the comparison result, whether or not a couplable external power source is suitable, and setting based, on the detection result, a potential corresponding to the identifying voltage.

11 Claims, 10 Drawing Sheets

ELECTRONIC DEVICE, DETECTION CIRCUIT AND VOLTAGE CONTROL METHOD

CROSS-REFERENCE TO RELATED APPLICATIONS

This application is based upon and claims the benefit of priority of the prior Japanese Patent Application No. 2008-091405, filed on Mar. 31, 2008 and the prior Japanese Patent Application No. 2009-026519, filed on Feb. 6, 2009, the entire contents of which are incorporated herein by reference.

FIELD

The embodiments discussed herein are related to an electronic device, a detection circuit, and a voltage control method.

BACKGROUND

Typical electronic devices are provided with a secondary battery as a drive power source. Such electronic devices include a charging circuit for charging the secondary battery using a charging current supplied from an external power source.

It is desirable that the main unit of an electronic device be able to control an AC adaptor to regulate the output voltage supplied from the AC adaptor to the main device. In this case, the AC adaptor includes a voltage regulating circuit, and a detection circuit included in the main device detects a voltage or the like to produce a control signal for controlling the voltage regulating circuit. Furthermore, since the main device needs to detect whether or not the coupled AC adaptor is suitable for the device, the AC adaptor outputs information identifying the AC adaptor to the main device. For example, the detection circuit of the main device monitors a voltage of the coupling terminal and determines whether or not the coupled AC adaptor is suitable for the device. The main device may not control an AC adaptor which is not suitable for the device, so the main device turns off a switch disposed in the power supply path to protect system circuits and the like of the main device.

In the above electronic device, the AC adaptor is coupled to the main device via, for example, a DC plug 90 illustrated in FIG. 1. In the DC plug 90, a cylindrical power terminal 92 is formed in the outer circumference surface of a cylindrical insulator 91; a cylindrical ground terminal 93 is formed in the inner circumference surface of the insulator 91; and a rod-like control terminal 94 is arranged at the axial center of the insulator 91. The length of the control terminal 94 is set shorter than the lengths of power terminal 92 and ground terminal 93 in a direction of inserting the DC plug 90. That is, the tip ends of the power terminal 92 and ground terminal 93 protrude further relative to the tip end of the control terminal 94. The AC adaptor outputs an identification signal via the control terminal 94 to the main device; and the main device outputs a control signal via the control terminal 94 to the AC adaptor.

As depicted in FIG. 1, the ground terminal 93 and power terminal 92, and then the control terminal 94 are electrically coupled in order to terminals of the main device. With this configuration, the signal (information) is supplied to the detection circuit of the main device after supplying the power supply voltage. Thus, in case the DC plug 90 coupled to the AC adaptor after the AC plug has been inserted in an AC outlet is coupled to the main device, the main device is prevented from being damaged. Such configuration in which coupling of the control terminal 94 is done after coupling of the power terminal 92 and ground terminal 93 is used not only by the DC plug 90 having this shape but also by a DC plug having another shape.

As further depicted in FIG. 1, in the above electronic device, during a period from coupling of the power terminal 92 and ground terminal 93 of the DC plug 90 to coupling of the control terminal 94, the terminal of the main device to be coupled to the control terminal is still not coupled. As a result, the potential of the terminal of the main device may become unstable, causing a malfunction.

SUMMARY

According to an aspect of the embodiments, a voltage control method includes producing an error signal based on a difference between a reference signal and an adaptor voltage and an adaptor current corresponding to the adaptor voltage, regulating, based on the error signal, the adaptor voltage, comparing a reference voltage to a voltage proportional to a potential corresponding to an identifying voltage corresponding to the adaptor voltage, detecting, based on the comparison result, whether or not a couplable external power source is suitable, and setting based on the detection result, a potential corresponding to the identifying voltage.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

These and/or other aspects and advantages will become apparent and more readily appreciated from the following description of the embodiments, taken in conjunction with the accompanying drawings of which.

DESCRIPTION OF EMBODIMENTS

An embodiment will be described below with reference to FIGS. 2 to 7.

Figure 1:
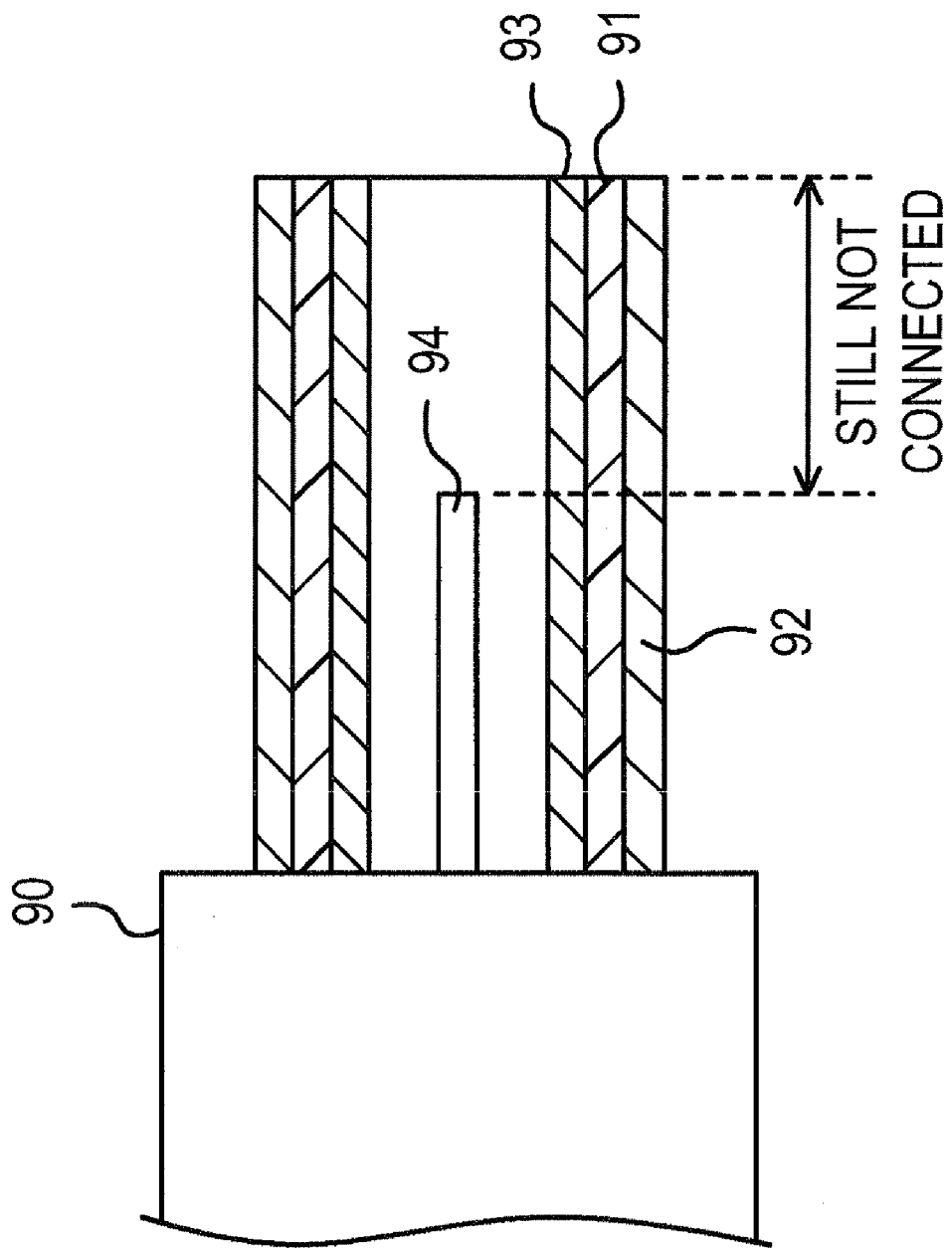
FIG. 1 illustrates a cross-sectional view of an exemplary DC plug.
Figure 2:
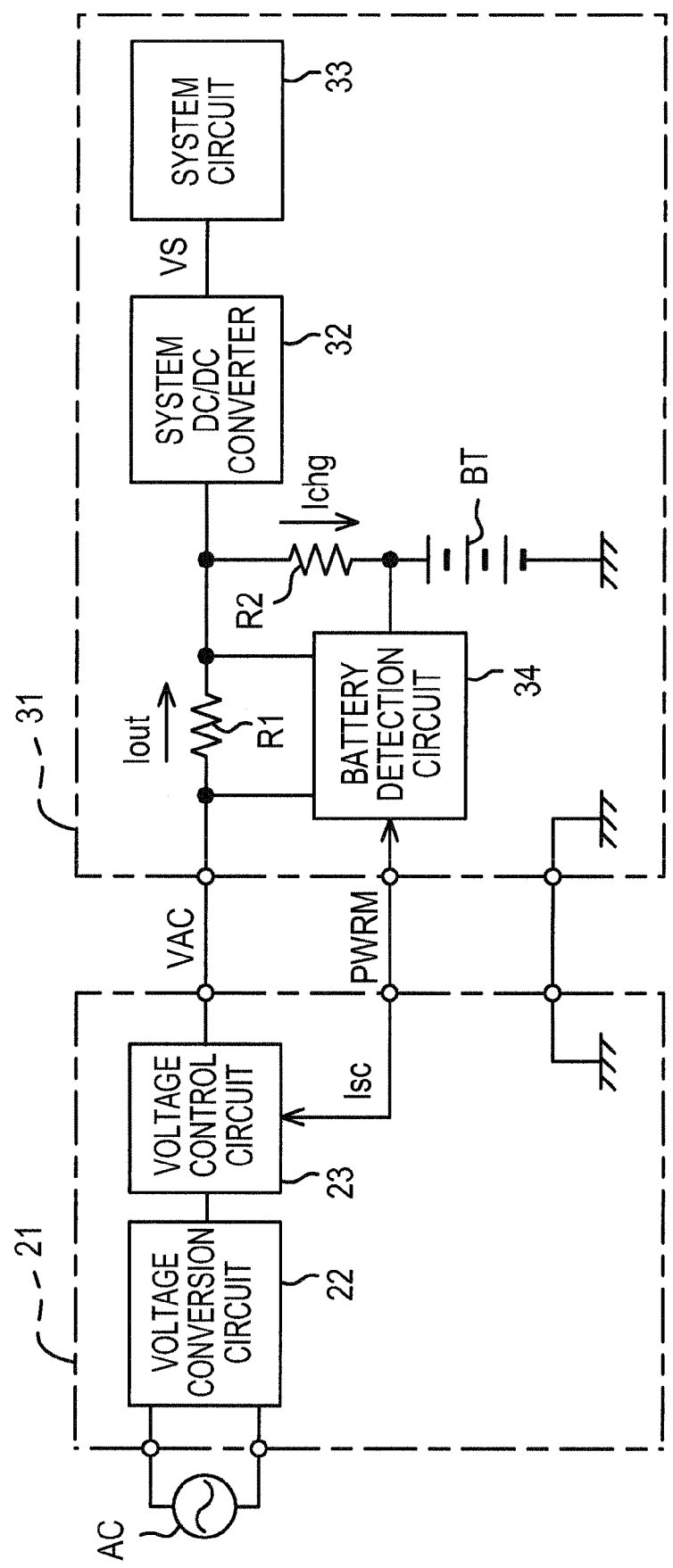
FIG. 2 illustrates an aspects of an electronic device related to an embodiment.

As shown in FIG. 2, an AC adaptor 21 acting as an external power source is coupled to a main device 31. The AC adaptor 21 is coupled to an AC power source, and commercial AC voltage supplied from the AC power source is input to a voltage conversion circuit 22 of the AC adaptor 21. The voltage conversion circuit 22 converts an AC voltage into a DC voltage and outputs the DC voltage. A voltage control circuit 23, which receives control current Isc, has a function of producing, based on the control current Isc, a regulated adaptor voltage VAC from the DC voltage. The AC adaptor 21 is coupled to the main device 31 via, for example, the DC plug 90 illustrated in FIG. 1, and supplies the produced adaptor voltage VAC to the main device 31. The voltage control circuit 23 further has a function of outputting, as an identifying voltage, a power limiting signal PWRM having a voltage value dependent on power information of the AC adaptor 21.

As further shown in FIG. 2, the adaptor voltage VAC is supplied via a resistor R1 to a system DC/DC converter 32. Coupled via a resistor R2 to the system DC/DC converter 32 is a secondary battery ("battery" for short) BT. The system DC/DC converter 32 produces, based on the adaptor voltage VAC and a battery voltage supplied from the battery, a system voltage VS obtained by voltage conversion of an input voltage and supplies the system voltage VS to a system circuit 33. Consequently, a power dependent on at least one of the power supplied from the AC adaptor 21 and the power supplied from the battery BT is supplied to the system circuit 33. The system circuit 33 is a circuit that provides various types of functions of the main device 31.

As further shown in FIG. 2, the battery detection circuit 34 of the main device 31 includes one or more semiconductor devices. The semiconductor device includes a chip and/or a package including the chip. The battery detection circuit 34 is coupled to both terminals of the resistor R1 and coupled between the resistor R2 and battery BT. The battery detection circuit 34 detects based on a voltage across the resistor R1, current (adaptor current) Iout flowing in the resistor R1. Also, the battery detection circuit 34 detects, based on a voltage across the resistor R2, current (battery current) Ichg flowing in the resistor R2. Furthermore, the battery detection circuit 34 detects a voltage (or an adaptor voltage VAC) supplied to the system DC/DC converter 32 and detects a terminal voltage of the battery BT. The battery detection circuit 34 produces a control current Isc based on the detected voltage and current, and on a power limiting signal PWRM supplied from the AC adaptor 21. The control current Isc is supplied to the voltage control circuit 23 of the AC adaptor 21. Consequently, the voltage control circuit 23 of the AC adaptor 21 regulates adaptor voltage VAC according to the control current Isc output from the battery detection circuit 34.

As further shown in FIG. 2, the battery detection circuit 34 determines, based on a voltage of the control terminal to which power limiting signal PWRM is supplied, whether or not an AC adaptor is suitable for supplying power to the main device 31. An appropriate AC adaptor has a control terminal and has a function of regulating its output voltage in response to control current Isc output from the battery detection circuit 34, whereas an inappropriate AC adaptor does not regulate its output voltage. Determining that the AC adaptor coupled is appropriate, the battery detection circuit 34 supplies power supplied from the AC adaptor to the system DC/DC converter 32 and also charges the battery BT using the power. Meanwhile, when the battery detection circuit 34 determines that the AC adaptor coupled is inappropriate, the battery detection circuit 34 does not supply power supplied from the AC adaptor to the system DC/DC converter 32 and the battery BT.

An exemplary configuration of the AC adaptor 21 will be described with reference to FIG. 3.

Figure 3:
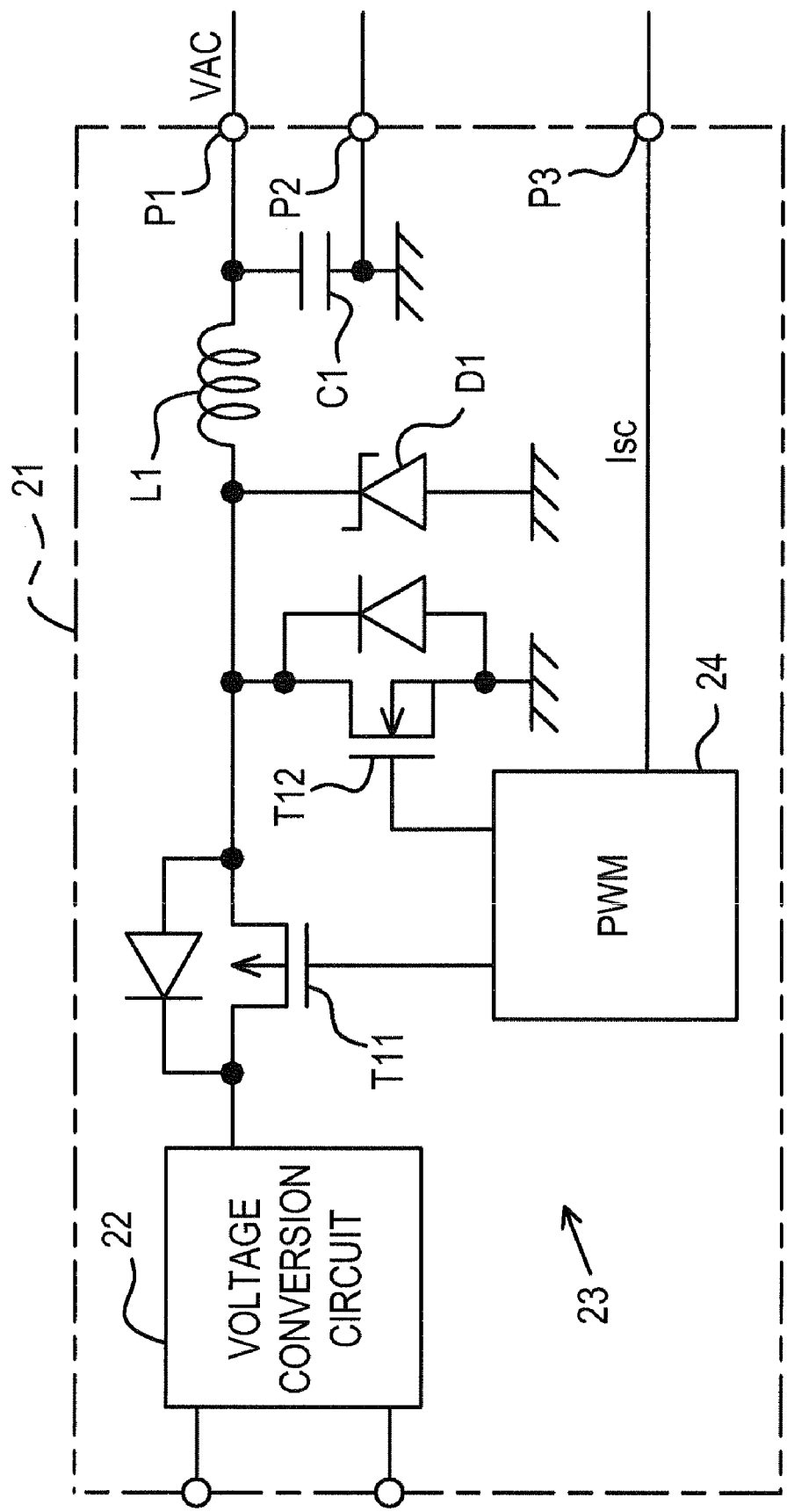
FIG. 3 illustrates an aspect of the AC adaptor in FIG. 2.

As illustrated in FIG. 3, an output terminal of the voltage conversion circuit 22 is coupled to a first terminal (for example, source) of a first transistor T11; a second terminal (for example, drain) of the first transistor T11 is coupled to a first terminal of a choke coil L1; and a second terminal of the choke coil L1 is coupled to a first terminal P1 acting as a power source terminal. The second terminal of the first transistor T11 is also coupled to a first terminal (for example, drain) of a second transistor T12; a second terminal (for example, source) of the second transistor T12 is coupled to the ground. A control terminal (gate) of the first transistor T11 and a control terminal (gate) of the second transistor T12 are coupled to a pulse width modulator (PWM) 24. According to the present embodiment, the first transistor T11 is a p-channel MOS transistor; and the second transistor T12 is an n-channel MOS transistor. FIG. 3 also illustrates body diodes of the transistors T11 and T12.

A first terminal of the choke coil L1 is coupled to the cathode of the diode D1; and the anode of the diode D1 is coupled to the ground. The first terminal P1 is coupled to a first terminal of a smoothing capacitor C1; and a second terminal of the capacitor C1 is coupled to the ground. A second terminal P2 acting as a power source terminal is coupled to the ground; and a third terminal P3 acting as a control terminal is coupled to the pulse width modulator (PWM) 24. Input via the third terminal P3 to the pulse width modulator 24 is control current Isc. According to the present embodiment, the pulse width modulator 24 outputs, via the third terminal P3, a power limiting signal PWRM having a voltage dependent on power information of the AC adaptor 21.

As further illustrated in FIG. 3, the pulse width modulator (PWM) 24 performs on/off control of the first transistor T11 and second transistor T12 alternately using a given duty cycle. The output current of the transistor T11 is smoothed by the choke coil L1 and capacitor C1 due to the switching operation of the first transistor T11. In this case, when the first transistor T11 is in an ON state, the output voltage of the voltage conversion circuit 22 is supplied via the transistor T11 to an LC circuit (smoothing circuit including the choke coil L1 and capacitor C1). When the first transistor T11 is turned OFF and the second transistor T12 is turned ON, a current path is formed. Then, energy accumulated in the choke coil L1 when the first transistor T11 is in an ON state is discharged to the first terminal P1 side.

Furthermore, the pulse width modulator 24 modifies the duty cycle in response to control current Isc. For example, the pulse width modulator 24 modifies the duty cycle to vary the ON period of the first transistor T11 according to the value of control current Isc. An adaptor voltage VAC output from the AC adaptor 21 corresponds to the ON period of the first transistor T11. As the ON period of the first transistor T11 increases, the energy accumulated in the choke coil L1 becomes larger, so a higher adaptor voltage VAC is output. As the ON period of the first transistor T11 decreases, the energy accumulated in the choke coil L1 becomes smaller, so a lower adaptor voltage VAC is output.

Figure 4:
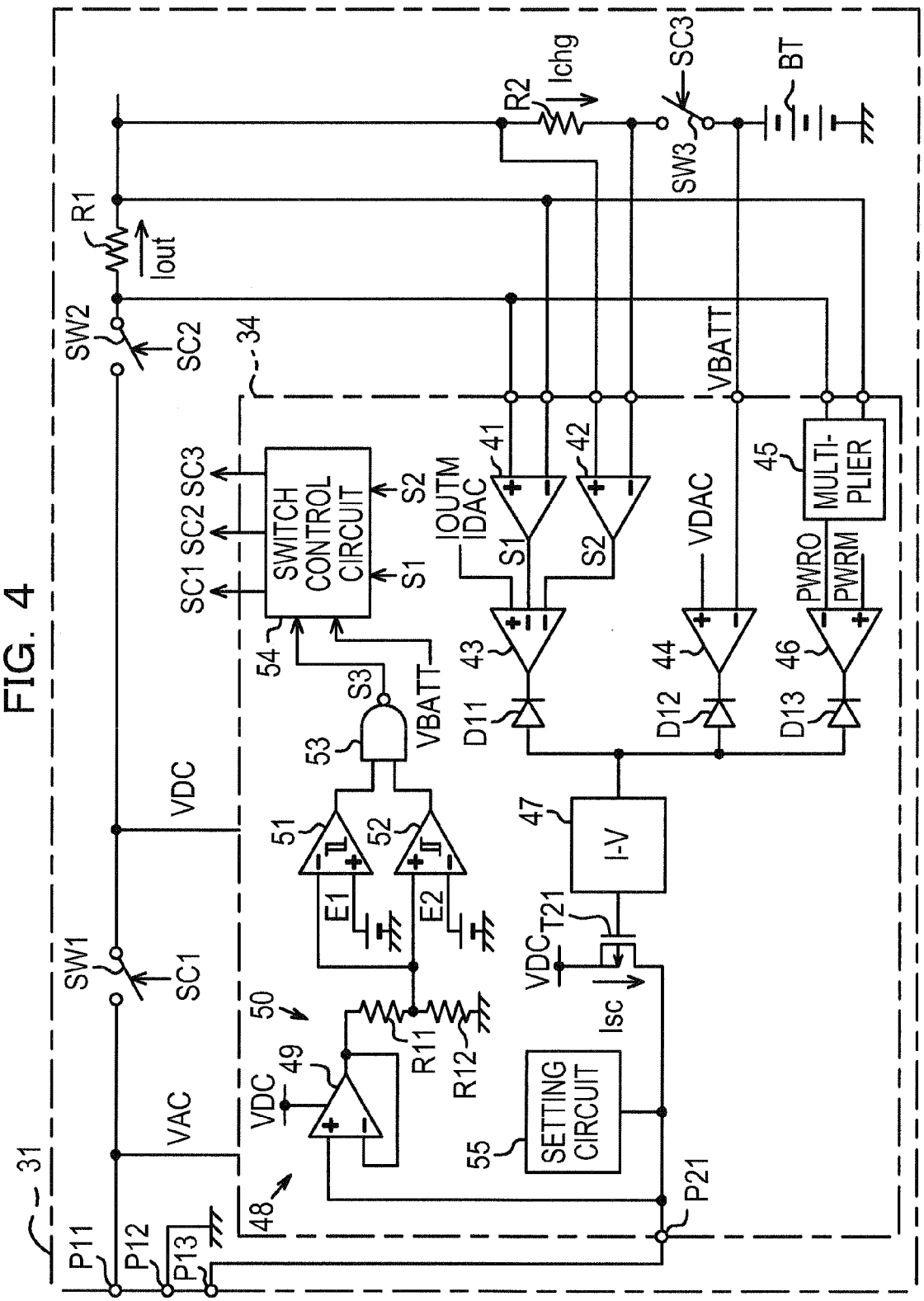
FIG. 4 illustrates an aspect of the main device in FIG. 2.

The first terminal P1 and second terminal P2 are coupled to a first terminal P11 and second terminal P12, respectively, illustrated in FIG. 4; and the third terminal P3 is coupled to a third terminal P13 illustrated in FIG. 4.

A configuration of the main device 31 will be described with reference to FIG. 4.

As illustrated in FIG. 4, the first terminal P11 acting as a power source terminal is coupled to the battery detection circuit 34 and a first terminal of a switch SW1. The second terminal P12 acting as a power source terminal is coupled to the ground. The third terminal P13 acting as a control terminal is coupled to the battery detection circuit 34.

As further illustrated in FIG. 4, a second terminal of the switch SW1 is coupled to the battery detection circuit 34 and a first terminal of a switch SW2. A second terminal of the switch SW2 is coupled to a first terminal of the resistor R1, and a second terminal of the resistor R1 is coupled to the system DC/DC converter 32 (refer to FIG. 2) and a first terminal of the resistor R2. A second terminal of the resistor R2 is coupled to a first terminal of a switch SW3, a second terminal of the switch SW3 is coupled to a positive terminal of the battery BT, and a negative terminal of the battery BT is coupled to the ground.

The switches SW1 to SW3 are each an analog switch including a p-channel MOS transistor, for example, and their control terminals are coupled to the battery detection circuit 34. The switches SW1 to SW3 turn ON or OFF in response to control signals SC1 to SC3 supplied from the battery detection circuit 34. Some of the circuits included in the battery detection circuit 34 operate on power supply from the battery BT to turn ON/OFF switches SW1 to SW3 when a given adaptor voltage VAC is not supplied via the first terminal P11, that is, when the AC adaptor 21 is not coupled. In the present embodiment, some circuits included in the battery detection circuit 34 at least control the ON/OFF of the third switch SW3. Consequently, the system circuit 33 illustrated in FIG. 2 may operate using the system voltage VS supplied via the system DC/DC converter 32 from the battery BT.

However, when the adaptor voltage VAC produced by the AC adaptor 21 illustrated in FIG. 3 is supplied via the first terminal P11, some circuits included in the battery detection circuit 34 operate using the adaptor voltage VAC. When the adaptor voltage VAC of a given value or more is supplied, the operating circuits turn ON the first switch SW1. As a result, the adaptor voltage VAC is supplied as drive voltage VDC via the first switch SW1 to the battery detection circuit 34. Many circuits included in the battery detection circuit 34 operate using the drive voltage VDC to regulate adaptor voltage VAC, charge the battery BT, and perform other operations.

As further illustrated in FIG. 4, both terminals of the resistor R1 are coupled to input terminals of a current amplifier 41 of the battery detection circuit 34; and both terminals of the resistor R2 are coupled to input terminals of a current amplifier 42. The current amplifier 41 detects current Iout flowing in the resistor R1, that is, an output current of the AC adaptor 21, and outputs a current detection signal S1 corresponding to the detection result to an error amplifier 43 acting as a differential amplifier. The current amplifier 42 detects current Ichg flowing in the resistor R2, that is, charge current Ichg flowing to the battery BT, and outputs charging current detection signal S2 corresponding to the detected current to the error amplifier 43.

As further illustrated in FIG. 4, the error amplifier 43 includes two inverted input terminals and one non-inverted input terminal. In the error amplifier 43, the current detection signal S1 is input to the first inverted input terminal, and charging current detection signal S2 is input to the second inverted input terminal. Input to the non-inverted input terminal of the error amplifier 43 is a reference signal based on current reference signal IOUTM and limiting current signal IDAC. The current reference signal IOUTM is set according to the total amount of current used in the main device 31; and the limiting current signal IDAC is set to a voltage set according to the charging current of the battery BT. The error amplifier 43 compares the reference signal with the larger of the current detection signal S1 and charging current detection signal S2, and produces an error voltage dependent on the comparison result.

As further illustrated in FIG. 4, a coupling point between the resistor R2 and the battery BT is coupled to an inverted input terminal of an error amplifier 44. A voltage limiting signal VDAC is input to a non-inverted input terminal of the error amplifier 44. The error amplifier 44 amplifies a difference between a terminal voltage of the battery BT and voltage limiting signal VDAC to produce an error voltage.

As further illustrated in FIG. 4, both terminals of the resistor R1 are coupled to a multiplier 45. The multiplier 45 detects the terminal voltage across the resistor R1, that is, the drive voltage VDC, and also detects the total amount of current from the voltage across the resistor R1. Then, the multiplier 45 multiplies the drive voltage VDC by the total amount of current to obtain a power detection signal PWRO, and outputs the power detection signal PWRO to an error amplifier 46. In the error amplifier 46, the power detection signal PWRO is input to an inverted input terminal of the error amplifier 46, and a power limiting signal PWRM is input to the non-inverted input terminal the error amplifier 46. The power limiting signal PWRM is supplied to the error amplifier 46 via an input/output terminal P21 coupled to the third terminal P13 of the main device 31. The error amplifier 46 amplifies a difference between the power detection signal PWRO and the power limiting signal PWRM to produce an error voltage.

In the battery detection circuit 34 according to the present embodiment, the error voltages corresponding to the four detected signals are produced by the three error amplifiers 43, 44, and 46. Typically, error amplifiers are arranged corresponding to each detected signal. According to the present embodiment, however, the error voltage with respect to the current Iout flowing in the resistor R1 and the error voltage with respect to the charging current Ichg corresponding to the battery BT are both produced by the error amplifier 43. Thus, the number of external components for the chip is reduced, that is, the number of external terminals is reduced, so the size of the chip and the size of a package in which the chip is sealed may be reduced.

As further shown in FIG. 4, the cathodes of diodes D11, D12, and D13 are coupled to the output terminals of the error amplifiers 43, 44, and 46, respectively. The anodes of the diodes D11 to D13 are coupled to each other and also coupled to a current-voltage conversion circuit 47. The diodes D11 to D13 transmit to the current-voltage conversion circuit 47 a current (error current) corresponding to the highest error voltage of the error voltages output from the error amplifiers 43, 44, and 46. This is one of the detected values which corresponds to the largest error.

As further illustrated in FIG. 4, a control terminal (gate) of a transistor T21 included in a constant current source (current control circuit) is coupled to an output terminal of the current-voltage conversion circuit 47. The current-voltage conversion circuit 47 supplies a signal of a voltage proportional to the amount of current to the gate of the transistor T21. According to the present embodiment, the transistor T21 is a p-channel MOS transistor. The drive voltage VDC is supplied to the source of the transistor T21, and the drain is coupled via the input/output terminal P21 of the package including the battery detection circuit 34 to the third terminal P13 of the main device 31.

As further illustrated in FIG. 4, the transistor T21 works as a resistor having a resistance value dependent on a voltage supplied to the gate thereof, and produces control current Isc dependent on the resistance value. The transistor T21, formed of a p-channel MOS transistor, exhibits a large resistance value for a high gate voltage, but exhibits a small resistance value for a low gate voltage. Consequently, as the output voltage of the current-voltage conversion circuit 47 increases, that is, the error that is the detection result increases, the transistor T21 reduces control current Isc; but as the output voltage of the current-voltage conversion circuit 47 decreases, that is, the error being the detection result decreases, the transistor T21 increases control current Isc.

As further illustrated in FIG. 4, when the battery BT is not mounted in the main device 31, the battery terminal voltage VBATT input to the error amplifier 44 is zero. Furthermore, the charging current detected by the error amplifier 43 is also zero. Consequently, the error is large, so the input current of the current-voltage conversion circuit 47 is large. In this case, the control current Isc flowing in the transistor T21 is small, so the voltage control circuit 23 of the AC adaptor 21 outputs a lower adaptor voltage VAC. In this state, when the battery BT is mounted, the difference between the terminal voltage of the battery BT and adaptor voltage VAC supplied from the AC adaptor 21 is small, so inrush current to the battery BT is suppressed.

As further illustrated in FIG. 4, a monitoring circuit 48 is coupled to the input/output terminal P21 of the battery detection circuit 34. A power limiting signal PWRM output from the AC adaptor 21 illustrated in FIG. 3 is supplied via the input/output terminal P21 from the third terminal P13 of the main device 31 to the input/output terminal P21. The monitoring circuit 48 monitors a voltage of the terminal P13, monitors a voltage of the input/output terminal P21, and produces an adaptor detection signal S3 corresponding to the monitoring result.

As further illustrated in FIG. 4, the monitoring circuit 48 includes an operational amplifier 49, voltage divider circuit 50, comparators 51 and 52, and a NAND circuit 53. A non-inverted input terminal of the operational amplifier 49 is coupled to the input/output terminal P21, and an output signal of the operational amplifier 49 is fed back to an inverted input terminal thereof. The voltage divider circuit 50 is coupled to an output terminal of the operational amplifier 49. The voltage divider circuit 50 includes resistors R11 and R12 coupled in series, and produces a voltage obtained by dividing the output voltage of the operational amplifier 49 according to the resistance values of the resistors R11 and R12. This divided voltage is supplied to an inverted input terminal of the comparator 51 and a non-inverted input terminal of the comparator 52.

A reference voltage (comparison reference voltage) E1 is input to a non-inverted input terminal of the comparator 51., and a reference voltage (comparison reference voltage) E2 is input to an inverted input terminal of the comparator 52. The comparators 51 and 52 are both a Schmitt Trigger comparator. The comparators 51 and 52 compare the divided voltage with reference voltages E1 and E2, respectively, and output a signal of a level corresponding to the comparison result.

As further illustrated in FIG. 4, the NAND circuit 53 calculates a negative AND of the output signals of the comparators 51 and 52, and thereby produces an adaptor detection signal S3.

As further illustrated in FIG. 4, the monitoring circuit 48 monitors whether or not the voltage of the power limiting signal PWRM is in a given range, and outputs the adaptor detection signal S3 corresponding to the monitoring result. The range set in the monitoring circuit 48 is used to determine whether or not an AC adaptor coupled is suitable for the main device 31 including the monitoring circuit 48. That is, reference voltages E1 and E2 are set correspondingly to an AC adaptor suitable for the main device 31. The monitoring circuit 48 produces, upon the coupling of an AC adaptor suitable for the main device 31, the adaptor detection signal S3 of L level but produces, upon coupling of an AC adaptor unsuitable for the main device 31, the adaptor detection signal S3 of H level.

As further illustrated in FIG. 4, a switch control circuit 54 receives the above described current detection signal S1 and charging current detection signal S2, and also receives adaptor detection signal S3 and battery voltage detection signal. The battery voltage detection signal is a signal produced by a comparator 44 based on a battery terminal voltage VBATT. The comparator 44 compares a voltage obtained by dividing the battery terminal voltage VBATT with a reference voltage, and produces a battery voltage detection signal corresponding to the comparison result. The reference voltage is set according to battery terminal voltage VBATT when the battery BT is fully charged, for example.

The first to third switches SW1 to SW3 are coupled to the switch control circuit 54. The switch control circuit 54 produces control signals SC1 to SC3 in response to the signals S1 to S4. By way of example, after the battery BT has been fully charged, the switch control circuit 54 produces a control signal SC3 based on the battery voltage detection signal S4, and turns OFF the third switch SW3. As a result, the battery BT is protected from overcharge. By way of example, when an unsuitable AC adaptor is coupled to the main device 31, the switch control circuit 54 produces the control signal SC1 based on the adaptor detection signal S3, and turns OFF the first switch SW1. As a result, the main device 31 is prevented from being damaged by coupling of the unsuitable AC adaptor.

As further illustrated in FIG. 4, the battery detection circuit 34 includes a setting circuit 55 that limits a current (clamps the current value to a given value) applied to the input/output terminal P21. According to the present embodiment, the setting circuit 55 is coupled to the input/output terminal P21, that is, the drain terminal of the transistor T21 that outputs the control current Isc.

Figure 5:
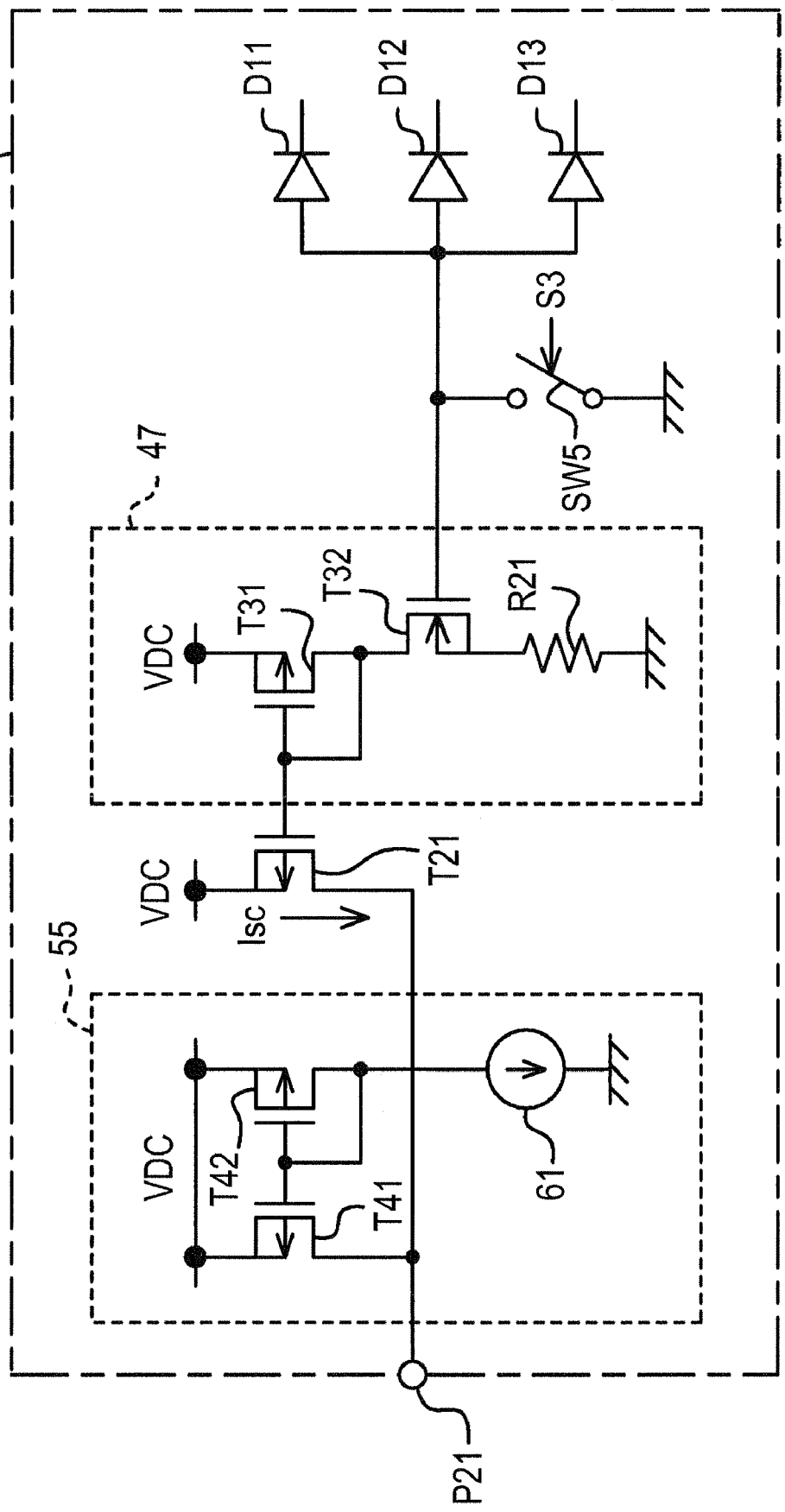
FIG. 5 illustrates an aspect of the voltage control circuit in FIG. 4.
Figure 6:
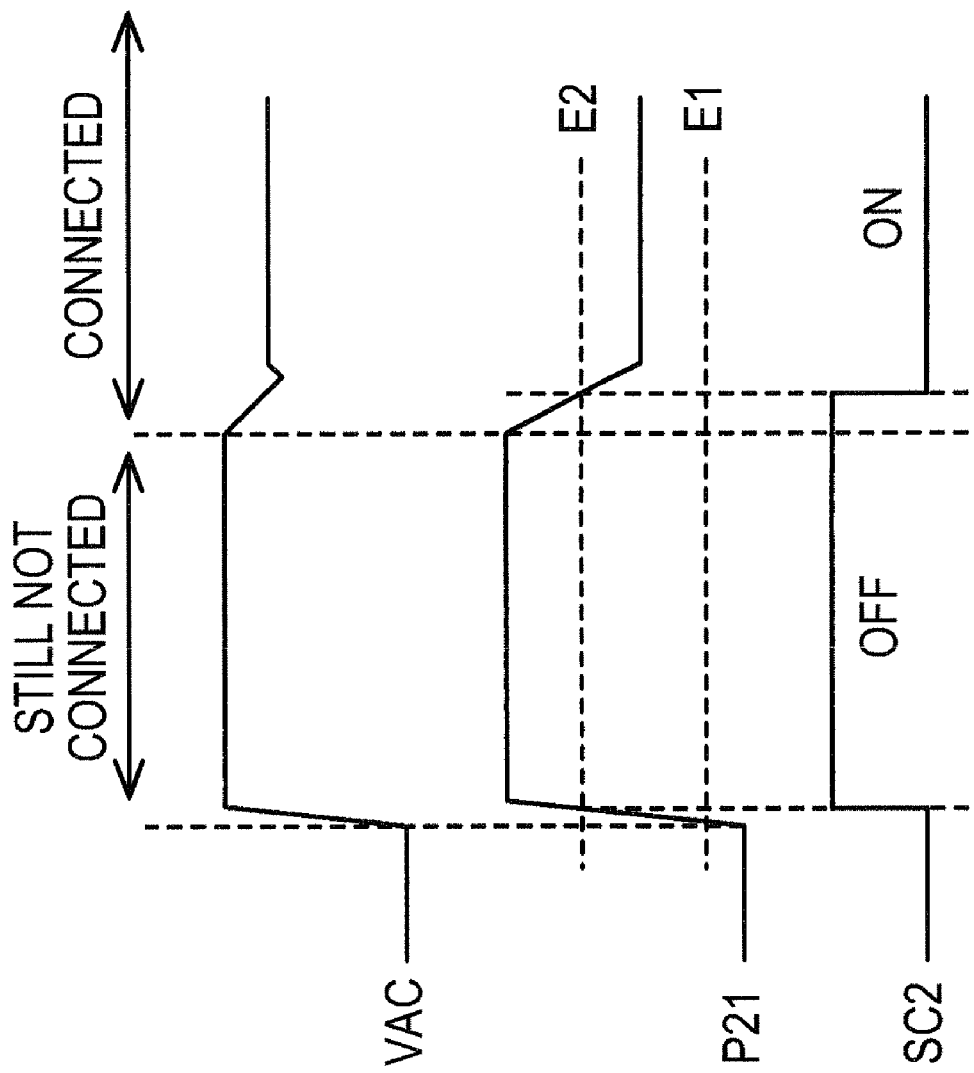
FIG. 6 illustrates a timing chart of an aspect of the operation of the voltage control circuit in FIG. 4.

As illustrated in FIG. 5, the current-voltage conversion circuit 47 in FIG. 4 includes transistors T31 and T32, and a resistor R21. The transistor T31 is a p-channel MOS transistor. The transistor T31 is coupled in current mirror form to an output transistor T21. The drive voltage VDC is supplied to the source of the transistor T31. The gate and drain of the transistor T31 are coupled to each other and also coupled to the gate of the transistor T21. Furthermore, the drain of the transistor T31 is coupled to a transistor T32. The transistor T32 is an n-channel MOS transistor. The drain of the transistor T32 is coupled to the transistor T31. The gate of the transistor T32 is coupled to the anodes of the diodes D11 to D13. The source of the transistor T32 is coupled to a first terminal of a resistor R21, and a second terminal of the resistor R21 is coupled to a ground. The gate of the transistor T21 is coupled to a first terminal of a switch SW5 that turns ON or OFF in response to an adaptor detection signal S3, and a second terminal of the switch SW5 is coupled to a ground.

As further illustrated in FIG. 5, the transistor T32 works as a resistor having a resistance value dependent on a current (error current) flowing in the diodes D11 to D13, and produces, at a node between the transistor T31 and transistor T32, a voltage proportional to the error current. This node voltage is supplied to the gate of the transistor T21. Consequently, in the current-voltage conversion circuit 47, a signal of a voltage value proportional to the amount of current is supplied to the gate of the transistor T21. Then, the transistor T21 produces the control current Isc corresponding to the voltage supplied to the gate thereof.

As further illustrated in FIG. 5, the setting circuit 55 includes transistors T41 and T42, and a constant current source 61. The drive voltage VDC is supplied to the source of the transistor T41; the drain of the transistor T41 is coupled to the input/output terminal P21; and the gate of the transistor T41 is coupled to the gate of the transistor T42. The drive voltage VDC is supplied to the source of the transistor T42; the gate and drain of the transistor T42 are coupled to each other. Consequently, the transistors T41 and T42 constitute a current mirror circuit. The drain of the transistor T42 is coupled to the constant current source 61.

The setting circuit 55 sends a current value equal to the value of the current flowing in the constant current source 61. That is, a current is supplied from the setting circuit 55 to the input/output terminal P21 at all times. The amount of current from the setting circuit 55 is set to a value (for example, 1 $\mu$A) which does not affect the current value of control current Isc or the voltage value of power limiting signal PWRM.

Consequently, the potential of the input/output terminal P21 when the transistor T21 coupled parallel to the setting circuit 55 is in an OFF state, is the level of the drive voltage VDC. The potential of the input/output terminal P21 stabilizes the operation of the battery detection circuit 34. The operation mechanism will be described in detail.

As further illustrated in FIG. 5, in the battery detection circuit 34, the transistor T21 is controlled so that control current Isc flows according to the output voltages of the error amplifiers 43, 44, and 46, that is, according to the detected objects (the output current Iout, the charging current Ichg, the terminal voltage of the battery BT, and the voltage across the resistor R1). In a battery detection circuit not including the setting circuit 55, when the DC plug 90 (refer to FIG. 1) is inserted, during a period from the time the power source terminals P1 and P2 of the DC plug 90 are coupled to the power source terminals P11 and P12 of the main device 31 to the time the control terminals P3 and P13 of the two devices are coupled, the control terminal P13 (input/output terminal P21) is in a floating state. Consequently, the potential of the input/output terminal P21 is the level of the drive voltage VDC.

The monitoring circuit 48 determines that an unsuitable AC adaptor has been coupled and outputs the adaptor detection signal S3 corresponding to the determination result, so the switch control circuit 54 turns OFF the switches SW2 and SW3 in response to the adaptor detection signal S3. Furthermore, the switch SW5 turns ON in response to the adaptor detection signal S3. Then, the transistor T32 of the current-voltage conversion circuit 47 turns OFF and current does not flow to the transistor T31. As a result, current does not flow to the transistor T21, that is, the transistor T21 turns OFF. Then, the potential of the input/output terminal P21 lowers due to leak current. When the potential of the input/output terminal P21 becomes lower than a threshold voltage of the monitoring circuit 48, the monitoring circuit 48 may determine that a suitable AC adaptor has been coupled, that is, may make an erroneous determination, and may output the adaptor detection signal S3 corresponding to the determination result, so the switch control circuit 54 may turn ON the switches SW2 and SW3 in response to the adaptor detection signal S3. Furthermore, the switch SW5 turns OFF in response to the adaptor detection signal S3. Then, in the battery detection circuit 34, the transistor T21 is controlled so that control current Isc flows according to the output voltages of the error amplifiers 43, 44, and 46.

Figure 7:
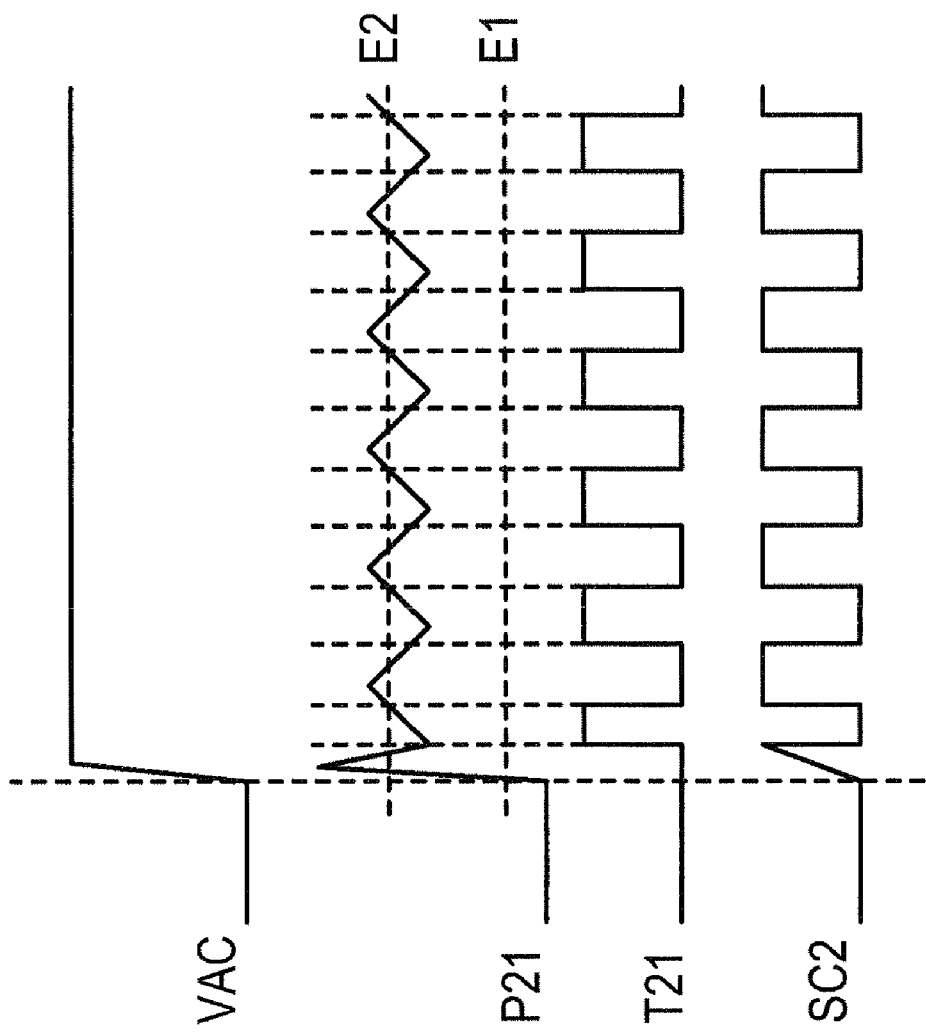
FIG. 7 illustrates a timing chart of an aspect the operation of the voltage control circuit in FIG. 4.

As shown in FIG. 7, the potential of the input/output terminal P21 rises and falls in a repeating manner. The monitoring circuit 48 erroneously determines, based on the potential of the input/output terminal P21, that a suitable AC adaptor has not been coupled. In the battery detection circuit 34, the transistor T21 turns ON and OFF in a repeating manner, and the switches SW2 and SW3 also turn ON and OFF in a repeating manner. Such repeating operation continues until the control terminals P3 and P13 are coupled. That is, the potential of the input/output terminal P21 becomes unstable.

According to the present embodiment, in the battery detection circuit 34, the switch SW5 is turned ON in response to the adaptor detection signal S3, and thus the transistor T21 turns OFF. In this case, the potential of the input/output terminal P21 becomes the level of the drive voltage VDC due to the current produced by the setting circuit 55. Since the setting circuit 55 sends the current, the potential of the input/output terminal P21 is kept at the level of the drive voltage VDC. The monitoring circuit 48 determines that an unsuitable AC adaptor has been coupled, and continuously outputs adaptor detection signal S3 corresponding to the determination result, and the switch control circuit 54 turns OFF the switches SW2 and SW3 in response to the adaptor detection signal S3. As a result, system voltage VS supplied from the AC adaptor to the converter 32 illustrated in FIG. 2 changes to zero.

When the control terminals P3 and P13 are coupled to each other with a suitable AC adaptor 21, the potential of the terminal P21 falls due to a load provided in the AC adaptor 21, and the voltage level of the power limiting signal PWRM supplied from the AC adaptor 21 is provided. Then, since the potential of the terminal P21 becomes lower than a reference voltage E2, the monitoring circuit 48 outputs the adaptor detection signal S3 of level H. Then, the switch SW5 turns OFF, and the transistor T21 sends the control current Isc in response to the output voltages of the error amplifiers 43, 44, and 46. The switch control circuit 54 turns ON the switches SW1 and SW2 in response to the adaptor detection signal S3. As a result, voltage regulated by the AC adaptor 21 is supplied to the main device 31.

When an unsuitable AC adaptor is coupled to the main device 31, the battery detection circuit 34 similarly repeats the operation. In this case, in the battery detection circuit 34, the switch SW1 may be turned OFF after the time to fully insert the DC plug, or a longer time, has elapsed, for example.

As described above, the present embodiment has the following advantageous effects.

(1) The AC adaptor 21 produces a direct-current adaptor voltage VAC, and varies the adaptor voltage VAC in response to the control current Isc and outputs the power limiting signal PWRM. The main device 31 includes the power source terminals P11 and P12, through which the adaptor voltage VAC produced by the AC adaptor 21 is input to the main device 31, and the control terminal P13, through which the power limiting signal PWRM is input to the main device 31. The main device 31 includes the system circuit 33 that operates based on adaptor voltage VAC input via the power source terminals P11 and P12, and the battery detection circuit 34 that detects the adaptor voltage VAC and the current Iout corresponding to the adaptor voltage VAC by use of the resistor R1 coupled between the power source terminal and system circuit. The battery detection circuit 34 produces an error signal corresponding to a difference between the adaptor voltage VAC as well as the current Iout and the comparison reference voltage; controls the transistor T21 based on the error signal; and supplies the control current Isc via the control terminal P13 (input/output terminal P21) to the AC adaptor 21. The monitoring circuit 48 compares a voltage proportional to the potential of the control terminal P13 (input/output terminal P21) to a reference voltage, and produces, based on the comparison result, the adaptor detection signal S3 indicating whether or not the adaptor coupled to the main device 31 is suitable for the main device 31. The switch control circuit 54 turns ON/OFF, based on the adaptor detection signal S3, the switch SW2 coupled between the power source terminal P11 and resistor R1. The setting circuit 55 sets the potential of the control terminal P13 (input/output terminal P21) to a given level.

The battery detection circuit 34 of the electronic device produces an error signal dependent on a difference between the detected adaptor voltage VAC as well as the detected current Iout and a comparison reference voltage, and supplies the control current Isc, which is produced based on the error signal, via the control terminal P13 (input/output terminal P21) to the AC adaptor 21. Also, the battery detection circuit 34 monitors a potential of the control terminal P13 (input/output terminal P21), and determines, based on the potential of the control terminal P13 (input/output terminal P21), whether or not an AC adaptor 21 suitable for the main device has been coupled to the main device. If the AC adaptor 21 is not suitable, the switch SW2 is turned OFF. The potential of the control terminal P13 (input/output terminal P21) is set to a given level by the setting circuit 55, so that in case the adaptor voltage VAC is supplied from the AC adaptor 21 and the control terminal is still not coupled, the potential of the control terminal P13 (input/output terminal P21) is suppressed from varying in response to the control current Isc, thus stabilizing the operation of the AC adaptor 21 when the AC adaptor 21 is being coupled to the main device 31.

(2) The setting circuit 55, coupled to the input/output terminal P21, is a constant current circuit which supplies constant current to the input/output terminal P21. Consequently, the potential of the input/output terminal P21, that is, the control terminal P13 is clamped to a given level with a simple configuration.

The above described embodiment may be implemented according to the following aspect.

According to the present embodiment, the setting circuit 55 is coupled to the input/output terminal P21, that is, to the drain terminal of the transistor T21 outputting the control current Isc. However, the coupling points of the current control circuit and the circuit configuration are not limited to those of the above embodiment.

Figure 8:
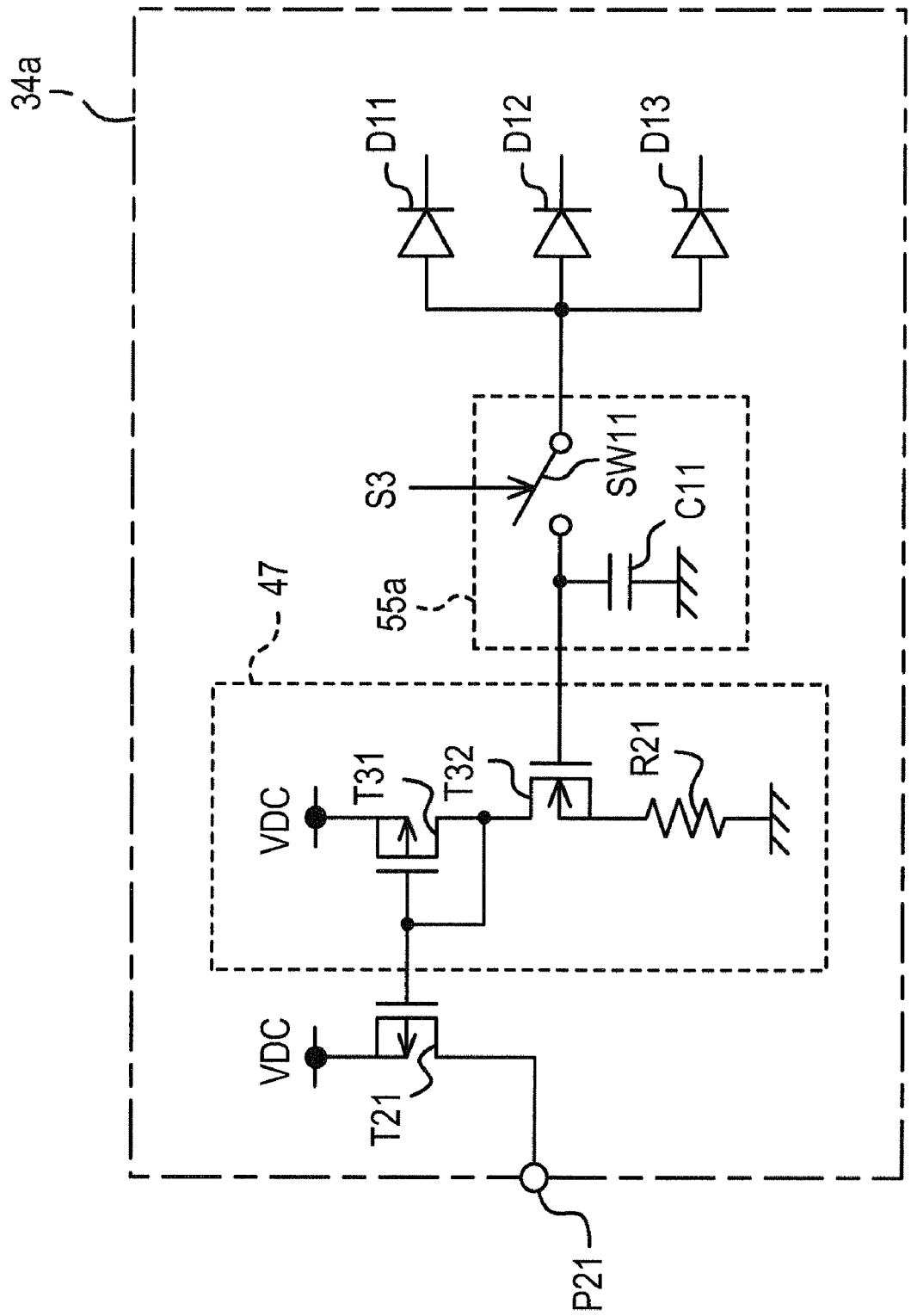
FIG. 8 illustrates another aspect of the voltage control circuit in FIG. 4.

By way of example, as shown in FIG. 8, a setting circuit 55a of a battery detection circuit 34a may be coupled to the input side of the current-voltage conversion circuit 47, that is, coupled between the current-voltage conversion circuit 47 and the diodes D1 to D3. The setting circuit 55a includes a switch SW11 and a capacitor C11. A first terminal of the switch SW11 is coupled to the anodes of the diodes D11 to D13; a second terminal of the switch SW11 is coupled to the gate of a transistor T32 included in the current-voltage conversion circuit 47 and a first terminal of the capacitor C11; and a second terminal of the capacitor C11 is coupled to the ground.

The adaptor detection signal S3 is supplied to the control terminal of the switch SW11. The switch SW11 turns OFF in response to the adaptor detection signal S3 (of level L in the circuit configuration illustrated in FIG. 4) when the coupling of an AC adaptor unsuitable for the main device 31 has been detected. The capacitor C11 holds a gate voltage of the transistor T32 when the switch SW11 turns OFF. Accordingly, the transistor T21 sends a current dependent on the voltage held by the capacitor C11.

As further shown in FIG. 8, when the monitoring circuit 48 detects that an AC adaptor suitable for the main device 31 has been coupled to the main device 31, the setting circuit 55a turns ON the switch SW11 in response to the adaptor detection signal S3. As a result, an error current flowing in the diodes D11 to D13 is transmitted to the gate of the transistor T32 included in the current-voltage conversion circuit 47. Accordingly, he transistor T21 sends a control current Isc corresponding to the error current.

Meanwhile, when the monitoring circuit 48 detects that an AC adaptor suitable for the main device 31 has been coupled to the main device 31, the setting circuit 55a turns off the switch SW11 in response to the adaptor detection signal S3. As a result, since the capacitor C11 holds a voltage just before the switch SW11 turns OFF, the transistor T21 sends the control current Isc corresponding to the error current. Accordingly, the potential of the input/output terminal P21 is equal to the level of the drive voltage VDC.

Figure 9:
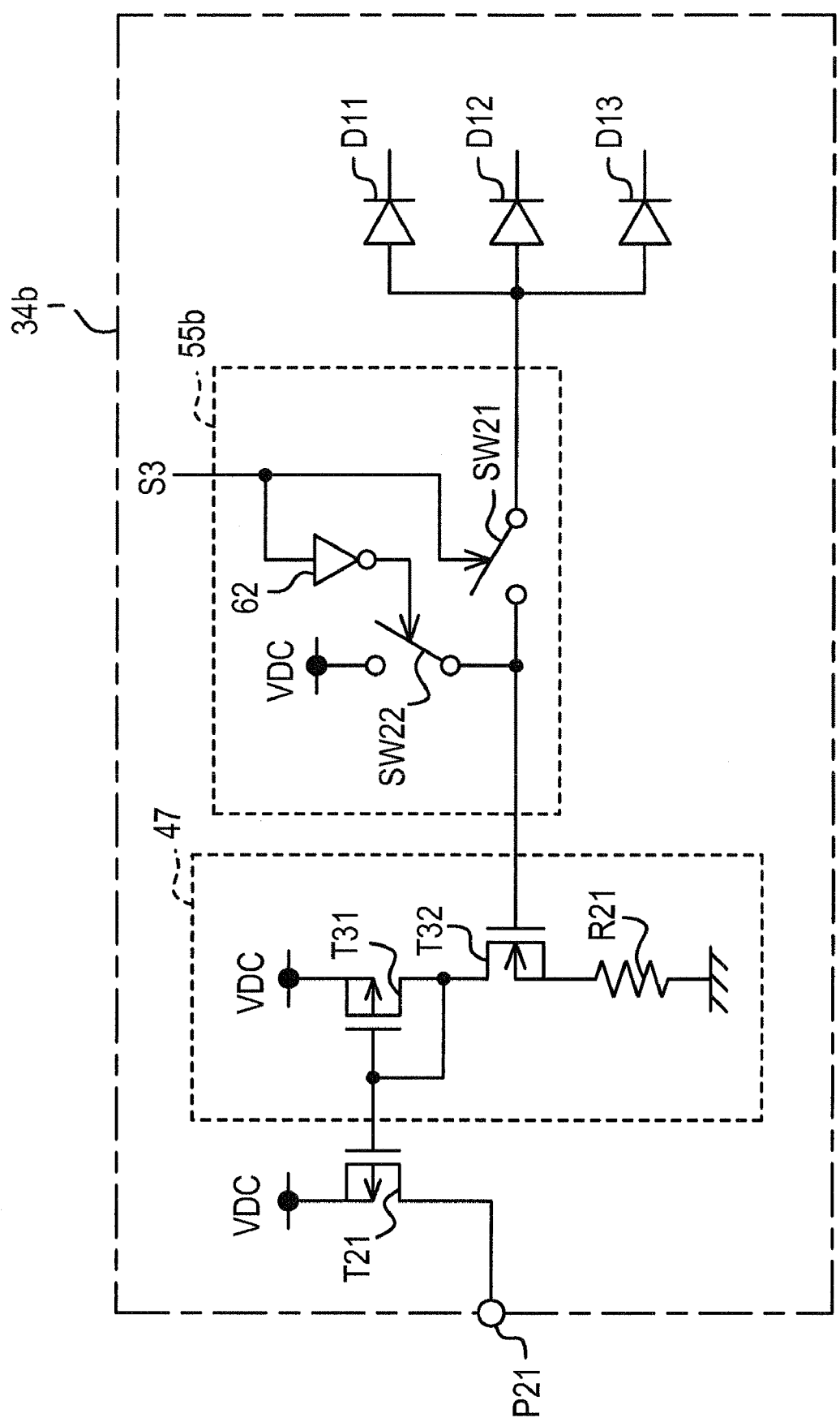
FIG. 9 illustrates another aspect of the voltage control circuit in FIG. 4.

As shown in FIG. 9, by way of example, a setting circuit 55b of a battery detection circuit 34b may coupled to the input side of the current-voltage conversion circuit 47, that is, coupled between the current-voltage conversion circuit 47 and the diodes D11 to D13. The setting circuit 55b includes two switches SW21 and SW22, and an inverter circuit 62. A first terminal of the switch SW21 is coupled to the anode of the diodes D11 to D13; and a second terminal of the switch SW21 is coupled to the gate of a transistor T32 included in the current-voltage conversion circuit 47. The drive voltage VDC is supplied to a first terminal of the switch SW22; a second terminal of the switch SW22 is coupled to the gate of the transistor T32 included in the current-voltage conversion circuit 47. The adaptor detection signal S3 is supplied to a control terminal of the first switch SW21. An output signal of the inverter circuit 62 which receives adaptor detection signal S3 is supplied to a control terminal of the switch SW22. Consequently, the first switch SW21 and second switch SW22 turn ON/OFF alternately in response to the adaptor detection signal S3.

As further shown in FIG. 9, in the setting circuit 55b, when the monitoring circuit 48 detects that an AC adaptor suitable for the main device 31 has been coupled to the main device 31, the first switch SW21 turns ON and the second switch SW22 turns OFF in response to the adaptor detection signal S3. As a result, the setting circuit 55b transmits an error current flowing in the diodes D11 to D13 to the gate of the transistor T32 included in the current-voltage conversion circuit 47. Accordingly, the transistor T21 sends a control current Isc corresponding to the error current.

Meanwhile, in the setting circuit 55b, when the monitoring circuit 48 detects that an AC adaptor suitable for the main device 31 has been coupled to the main device 31, the first switch SW21 turns OFF and the second switch SW22 turns ON in response to the adaptor detection signal S3. As a result, the drive voltage VDC is supplied to the gate of the transistor T32. Accordingly, the transistor T21 turns ON, so the potential of the input/output terminal P21 is substantially equal to the level of the drive voltage VDC.

Figure 10:
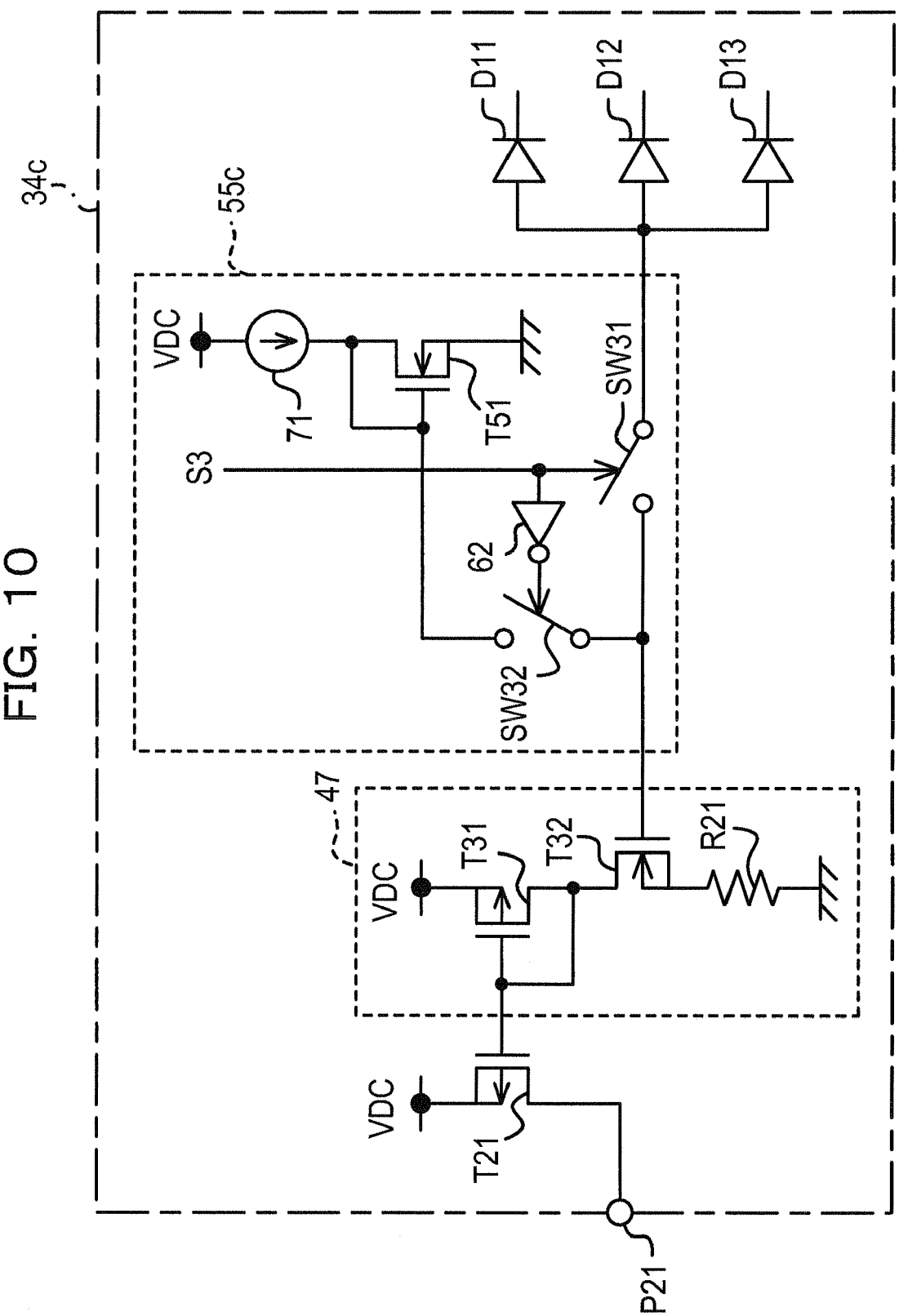
FIG. 10 illustrates another aspect of the voltage control circuit in FIG. 4.

As illustrated in FIG. 10, as another example, a setting circuit 55c of the battery detection circuit 34b may be coupled to the input side of the current-voltage conversion circuit 47, that is, coupled between the current-voltage conversion circuit 47 and the diodes D1 to D3. The setting circuit 55c includes two switches SW31 and SW32, an inverter circuit 62, a transistor T51, and a constant current source 71. A first terminal of the switch SW31 is coupled to anodes of diodes D11 to D13, and a second terminal of the switch SW31 is coupled to the gate of a transistor T32 included in the current-voltage conversion circuit 47. A first terminal of the switch SW32 is coupled to the gate of a transistor T51, and a second terminal of the switch SW32 is coupled to the gate of a transistor T32 included in the current-voltage conversion circuit 47. The transistor T51 is the similar channel-type MOS transistor as the transistor T32. The source of the transistor T51 is coupled to the ground and the drain is coupled to the constant current source 71. Further, the gate of the transistor T51 is coupled to the drain. Thus, the transistors T32 and T51 constitute a current mirror circuit when the switch SW32 turns ON, and the current proportional to the current value of the constant current source 71 flows to the transistor T32.

As further depicted in FIG. 10, the adaptor detection signal S3 is supplied to a control terminal of the first switch SW31. An output signal of the inverter circuit 62, to which the adaptor detection signal S3 is input, is supplied to a control terminal of the second switch SW32. Thus, the first switch SW31 and the second switch SW32 alternately turn ON/OFF in response to the adaptor detection signal 53.

In the setting circuit 55c of FIG. 10, when the monitoring circuit 48 detects that an AC adaptor suitable for the main device 31 has been coupled to the main device 31, in response to the adaptor detection signal S3, the first switch SW31 turns ON and the second switch SW32 turns OFF. As a result, the setting circuit 55c transmits the error current which flows to the diodes D11 to D13 to the gate of the transistor T32 included in the current-voltage conversion circuit 47. Accordingly, the transistor T21 sends control current Isc corresponding to the error current.

Meanwhile, in the setting circuit 55c, when the monitoring circuit 48 detects that an AC adaptor unsuitable for the main device 31 has been coupled to the main device 31, in response to the adaptor detection signal S3, the first switch SW31 turns OFF and the second switch SW32 turns ON. As a result, the setting circuit 55c supplies a gate voltage of the transistor T51 to the gate of the transistor T32. The transistor T32 sends current proportional to the current sent by the constant current source 71.

Accordingly, constant current flows into the transistor T21, and the potential of the input/output terminal P21 becomes the level of the drive voltage VDC.

The above described embodiment is implemented by using the error amplifier 43 which compares two input signals with a reference voltage and outputs an error voltage. However, the embodiment may be implemented by using an error amplifier which compares three or more input signals with a reference voltage and outputs an error voltage. Furthermore, the terminal inversion/non-inversion may be varied appropriately.

According to the above described embodiments, in the battery detection circuit 34 illustrated in FIG. 4, a voltage (output voltage) at the output side terminal of the resistor R1 is detected, but this may be omitted. For example, the embodiments may be implemented by using a battery detection circuit in which the multiplier 45, the error amplifier 46, and the diode D13 are omitted.

According to the above described embodiments, the adaptor voltage VAC is regulated in proportion to the control current Isc. However, the relationship between the control current Isc and the adaptor voltage VAC may be varied appropriately.

According to the above described embodiments, the power limiting signal PWRM is output from the pulse width modulator 24. However, the power limiting signal PWRM may be output from a circuit other than the pulse width modulator 24. For example, a circuit such as a register which outputs the power limiting signal PWRM may be coupled to the third terminal P3 acting as the control terminal.

The battery detection circuit of the electronic device produces an error signal corresponding to a difference between a detected adaptor voltage as well as an adaptor current and a comparison reference voltage, and supplies a control current produced based on the error signal via the control terminal to the external power source. Also, the battery detection circuit monitors a potential of the control terminal, and determines, based on the potential of the control terminal, whether or not an external power source suitable for the main device has been coupled to the main device, and if not, turns OFF the switch. The potential of the control terminal is set to a given level by the setting circuit. Thus, when an adaptor voltage is supplied from the external power source and the control terminal is still not coupled, the potential of the control terminal is suppressed from varying in response to the control current, so the operation is stabilized when the external power source is coupled.

According to the above described embodiments, the operation is stabilized when an external power source is coupled.

Numbers applied to the embodiments (first, second or third etc.) do not show priorities of the embodiments. Many variations and modifications will be apparent to those skilled in the art.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. An electronic device comprising:
a system circuit operating based on an adaptor voltage which is input to a power source terminal; and
a detection circuit detecting the adaptor voltage and an adaptor current corresponding to the adaptor voltage by a resistor coupled between the power source terminal and the system circuit,
wherein the detection circuit comprises:
an error amplifier outputting an error signal corresponding to a difference between the adaptor voltage and a reference signal;
a current control circuit coupled to a control terminal through which an identifying voltage is input and outputting, based on the error signal, a control current corresponding to the adaptor voltage;
a monitoring circuit coupled to the control terminal, comparing a reference voltage with a voltage corresponding to a potential of the control terminal based on the identifying voltage, and producing, based on a result of the comparison, a detection signal indicating whether or not an external power source connected to the power source terminal is suitable;
a switch control circuit turning on/off, based on the detection signal a switch coupled between the power source terminal and the resistor; and
a setting circuit setting the potential of the control terminal.

2. The electronic device according to claim 1,
wherein the setting circuit is a constant current circuit coupled to the control terminal and supplying a constant current to the control terminal.

3. The electronic device according to claim 1,
wherein the setting circuit is coupled between the error amplifier and the current control circuit, receives the detection signal, and clamps the potential of the control terminal through the current control circuit to the adaptor voltage based on the detection signal.

4. The electronic device according to claim 3,
wherein the current control circuit comprises a first MOS transistor including a drain coupled to the control terminal, a source receiving the adaptor voltage, and a gate coupled to a current-voltage conversion circuit; and the current-voltage conversion circuit that supplies a voltage proportional to the error signal produced by the error amplifier to the gate of the first MOS transistor,
wherein the current-voltage conversion circuit comprises a second MOS transistor coupled in current-mirror form to the first MOS transistor, a third MOS transistor coupled in series to the second MOS transistor, and a resistor, and
wherein the setting circuit is coupled between the error amplifier and a gate of the third MOS transistor, and when the detection signal is at a first level, transmits the error current produced by the error amplifier to the gate of the third MOS transistor, or when the detection signal is at a second level, cuts off the transmission of the error current and keeps the gate voltage of the third MOS transistor at the time of the cutoff.

5. The electronic device according to claim 3,
wherein the current control circuit comprises a first MOS transistor having a drain coupled to the control terminal, a source receiving the adaptor voltage, and a gate coupled to a current-voltage conversion circuit; and the current-voltage conversion circuit that supplies a voltage proportional to the error signal produced by the error amplifier to the gate of the first MOS transistor,
wherein the current-voltage conversion circuit comprises: a second MOS transistor coupled in current-mirror form to the first MOS transistor; a third MOS transistor coupled in series to the second MOS transistor; and a resistor, and
wherein the setting circuit is coupled between the error amplifier and the gate of the third MOS transistor, and when the detection signal is at a first level, transmits the error current produced by the error amplifier to the gate of the third MOS transistor, or when the detection signal is at a second level, cuts off the transmission of the error current and supplies the adaptor voltage to the gate voltage of the third MOS transistor.

6. The electronic device according to claim 1,
wherein the main device is coupled to a secondary battery producing a battery voltage,
wherein the system circuit operates using at least one of the adaptor voltage and the battery voltage,
wherein the detection circuit detects the battery voltage and a battery current corresponding to the battery voltage by use of a resistor coupled between the battery and the system circuit,
wherein the error amplifier produces an error signal based on a difference between the reference signal and at least two of the adaptor voltage, the adaptor current, the battery voltage, and the battery current, and
wherein the switch control circuit turns on/off, based on the detection signal, a first switch coupled between the power source terminal and the resistor and a second switch coupled between the resistor used to detect the battery current and the battery.

7. A detection circuit comprising:
an error amplifier outputting an error signal based on a difference between an adaptor voltage and an adaptor current based on the adaptor voltage and a reference signal;
a current control circuit outputting, based on the error signal, a control current corresponding to the adaptor voltage;
a monitoring circuit comparing a reference voltage with a voltage proportional to a potential based on an identifying voltage corresponding to the adaptor voltage, and producing, based on a result of the comparison, a detection signal indicating whether or not a coupled external power source is suitable;
a switch control circuit turning on/off, based on the detection signal, a switch coupled between the power source terminal and a resistor; and
a setting circuit setting a potential based on the identifying voltage.

8. The detection circuit according to claim 7,
wherein the setting circuit is a constant current circuit that supplies a constant current.

9. The detection circuit according to claim 7,
wherein the setting circuit is coupled between the error amplifier and the current control circuit, receives the detection signal, and clamps, based on the detection signal, a potential corresponding to the identifying voltage through the current control circuit to the adaptor voltage.

10. The detection circuit according to claim 7,
wherein the detection circuit is coupled to a secondary battery producing a battery voltage and to a system circuit that operates using at least one of the adaptor voltage and the battery voltage,
wherein the detection circuit detects the battery voltage and a battery current corresponding to the battery voltage by use of a resistor coupled between the battery and the system circuit,
wherein the error amplifier produces an error signal based on a difference between the reference signal and at least two of the adaptor voltage, the adaptor current, the battery voltage, and the battery current, and
wherein the switch control circuit turns on/off, based on the detection signal, a first switch coupled between the power source terminal and the resistor and a second switch coupled between the resistor used to detect the battery current and the battery.

11. A voltage control method comprising:
producing an error signal based on a difference between a reference signal and an adaptor voltage and an adaptor current corresponding to the adaptor voltage;
regulating, based on the error signal, the adaptor voltage;
comparing a reference voltage to a voltage proportional to a potential corresponding to an identifying voltage corresponding to the adaptor voltage;
detecting, based on the comparison result, whether or not a couplable external power source is suitable; and
setting based, on the detection result, a potential corresponding to the identifying voltage.

* * * * *